(12) United States Patent
Miyagano et al.

(10) Patent No.: US 9,415,806 B2
(45) Date of Patent: Aug. 16, 2016

(54) VEHICLE FRONT PORTION STRUCTURE

(71) Applicant: TOYOTA JIDOSHA KABUSHIKI KAISHA, Toyota-shi, Aichi-ken (JP)

(72) Inventors: Satoru Miyagano, Okazaki (JP); Kenji Sato, Ichinomiya (JP); Yukihiro Yukita, Taijmi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/959,854

(22) Filed: Dec. 4, 2015

(65) Prior Publication Data
US 2016/0176442 A1   Jun. 23, 2016

(30) Foreign Application Priority Data
Dec. 22, 2014   (JP) .................................. 2014-259193

(51) Int. Cl.
*B60N 99/00* (2006.01)
*B62D 21/15* (2006.01)
*B62D 25/08* (2006.01)

(52) U.S. Cl.
CPC .............. *B62D 21/152* (2013.01); *B62D 25/08* (2013.01)

(58) Field of Classification Search
CPC ............................. B62D 21/152; B62D 25/08
See application file for complete search history.

(56) References Cited

U.S. PATENT DOCUMENTS

| 2010/0096887 A1* | 4/2010 | Mori ................... | B62D 21/152 296/203.02 |
| 2013/0241233 A1 | 9/2013 | Ohnaka et al. | |
| 2014/0354008 A1* | 12/2014 | Sakakibara .......... | B62D 25/082 296/187.1 |

FOREIGN PATENT DOCUMENTS

| JP | 2005-067347 A | 3/2005 |
| JP | 2013193571 A | 9/2013 |
| JP | 2014-144715 A | 8/2014 |

* cited by examiner

*Primary Examiner* — Lori L Lyjak
(74) *Attorney, Agent, or Firm* — Oliff PLC

(57) ABSTRACT

There is provided a vehicle front portion structure having a front side member that extends along a vehicle longitudinal direction at a vehicle transverse direction outer side of a vehicle front portion, a gusset that is provided at a vehicle transverse direction outer side of a vehicle longitudinal direction front portion of the front side member, a first bead that is provided at a side surface of the gusset with the vehicle longitudinal direction being a length direction thereof, and that is structured as a concave portion that is recessed toward a vehicle transverse direction inner side or as a convex portion that projects-out toward a vehicle transverse direction outer side, and a second bead that is provided at a side surface of the front side member, and that is engaged with at least a rear end portion of the first bead.

6 Claims, 11 Drawing Sheets

VEHICLE FRONT PORTION STRUCTURE

CROSS-REFERENCE TO RELATED APPLICATION

This application claims priority under 35 USC 119 from Japanese Patent Application No. 2014-259193 filed on Dec. 22, 2014, the disclosure of which is incorporated by reference herein.

BACKGROUND

1. Technical Field

The present disclosure relates to a vehicle front portion structure.

2. Related Art

Japanese Patent Application Laid-Open (JP-A) No. 2013-193571 discloses a structure in which a gusset is disposed between a front side member that extends in the vehicle longitudinal direction, and a lower member that is disposed further toward the vehicle transverse direction outer side than the front side member. In this structure, the vehicle transverse direction inner side of the gusset is joined to the vehicle transverse direction outer side of the front side member. Note that, as a structure in which a load transmitting member is provided at the vehicle transverse direction outer side of a front side member, and as a structure in which an impact absorbing member is provided at the front end of a front side member, there are the structures disclosed in JP-A No. 2005-067347 and JP-A No. 2014-144715.

In the structure disclosed in above-described JP-A No. 2013-193571, collision load that is applied to the gusset is transmitted to the front side member due to the vehicle transverse direction inner side of the gusset being joined to the vehicle transverse direction outer side of the front side member. However, there is room for further improvement in making the impact absorption and the load transmission at the vehicle front portion be more efficient.

SUMMARY

In view of the above-described circumstances, the present disclosure provides a vehicle front portion structure in which the transmission of load from a gusset to a front side member at the time of a collision of a vehicle front portion can be accelerated.

A first aspect of the present disclosure is a vehicle front portion structure having a front side member that extends along a vehicle longitudinal direction at a vehicle transverse direction outer side of a vehicle front portion, a gusset that is provided at a vehicle transverse direction outer side of a vehicle longitudinal direction front portion of the front side member, a first bead that is provided at a side surface of the gusset with the vehicle longitudinal direction being a length direction thereof, and that is structured as a concave portion that is recessed toward a vehicle transverse direction inner side or as a convex portion that projects-out toward a vehicle transverse direction outer side, and a second bead that is provided at a side surface of the front side member, and that is engaged with at least a rear end portion of the first bead.

In accordance with the above-described first aspect, the gusset is provided at the vehicle transverse direction outer side of the vehicle longitudinal direction front portion of the front side member. The first bead, whose length direction is the vehicle longitudinal direction and that is structured as a concave portion that is recessed toward the vehicle transverse direction inner side or as a convex portion that projects-out toward the vehicle transverse direction outer side, is provided at the side surface of the gusset. The second bead is provided at the side surface of the front side member, and at least the rear end portion of the first bead of the gusset is engaged with the second bead. In this structure, the rigidity of the gusset is improved by the first bead that is provided at the side surface of the gusset. Due to at least the rear end portion of the first bead of the gusset being engaged with the second bead, the rigidity of the connected portion of the gusset and the front side member is improved. Due thereto, at the time of a collision of the vehicle front portion, the transmission of load from the gusset to the front side member can be accelerated.

A second aspect of the present disclosure is the vehicle front portion structure of the first aspect, wherein a sub-frame having a side portion that extends along the vehicle longitudinal direction is further provided at a vehicle lower side of the front side member, and, as seen in a vehicle plan view, the front side member and the side portion are connected within a region at which the gusset is provided in the vehicle longitudinal direction.

In accordance with the above-described second aspect, the sub-frame that has the side portion is provided at the vehicle lower side of the front side member. As seen in a vehicle plan view, the front side member and the side portion of the sub-frame are connected within a region at which the gusset is provided in the vehicle longitudinal direction. Due thereto, at the time of a collision of the vehicle front portion, load can be transmitted from the sub-frame to the front side member via the connected portion of the front side member and the side portion. At this time, due to the transmission of load from the gusset to the front side member being accelerated, the times of occurrence of the peak load, that is applied from the gusset to the front side member, and the peak load, that is applied from the side portion of the sub-frame via the connected portion to the front side member, are offset. Therefore, the burden of load at the rear portion side of the front side member can be reduced.

A third aspect of the present disclosure is the vehicle front portion structure of the second aspect, wherein a vehicle longitudinal direction front end portion of the side portion is positioned further toward a vehicle rear side than a vehicle longitudinal direction front end portion of the front side member, a first impact absorbing member is provided at a vehicle front side of the front end portion of the front side member, a second impact absorbing member is provided at a vehicle front side of the front end portion of the side portion, and a length, in the vehicle longitudinal direction, of the second impact absorbing member is longer than a length, in the vehicle longitudinal direction, of the first impact absorbing member.

In accordance with the above-described third aspect, the front end portion of the side portion of the sub-frame is positioned further toward the vehicle rear side than the front end portion of the front side member. The length of the second impact absorbing member, that is provided at the vehicle front side of the front end portion of the side portion, is longer than the length of the first impact absorbing member that is provided at the vehicle front side of the front end portion of the front side member. Due thereto, at the time of a collision of the vehicle front portion, the first impact absorbing member is crushed and load is inputted at an early stage from the gusset to the front side member, and the second impact absorbing member is crushed and load is inputted belatedly to the side portion of the sub-frame. Therefore, the times of occurrence of the peak load, that is applied from the gusset to the front side member, and the peak load, that is applied from the side portion of the sub-frame via the connected portion to the front side member, are offset more effectively, and the burden of load at the rear portion side of the front side member can be reduced.

A fourth aspect of the present disclosure is the vehicle front portion structure of the third aspect, wherein, as seen in a vehicle side view, a vehicle longitudinal direction front end portion of the first impact absorbing member and a vehicle longitudinal direction front end portion of the second impact absorbing member are structured so as to coincide in the vehicle longitudinal direction.

In accordance with the above-described fourth aspect, the front end portion of the first impact absorbing member and the front end portion of the second impact absorbing member are structured so as to coincide in the vehicle longitudinal direction, as seen in a vehicle side view. The times of occurrence of the peak load, that is applied from the gusset to the front side member, and the peak load, that is applied from the side portion of the sub-frame via the connected portion to the front side member, can be offset even more effectively. Therefore, the burden of load at the rear portion side of the front side member can be reduced.

A fifth aspect of the present disclosure is the vehicle front portion structure of any one of first through fourth aspects, wherein the first bead is the concave portion, the second bead is made into a shape that is recessed toward a vehicle transverse direction inner side, and the second bead and the concave portion are engaged due to the concave portion being disposed at an interior of the second bead.

In accordance with the above-described fifth aspect, the first bead is the concave portion, and the second bead is made into a shape that is recessed toward the vehicle transverse direction inner side. The second bead and the concave portion are engaged due to the concave portion being disposed at the interior of the second bead. Due thereto, the rigidity of the connected portion of the gusset and the front side member can be improved.

A sixth aspect of the present disclosure is the vehicle front portion structure of any one of the first through fourth aspects, wherein the first bead is the convex portion, the second bead is made into a shape that projects-out toward a vehicle transverse direction outer side, and the second bead and the convex portion are engaged due to the second bead being disposed at an interior of the convex portion.

In accordance with the above-described sixth aspect, the first bead is the convex portion, and the second bead is made into a shape that projects-out toward the vehicle transverse direction outer side. The second bead and the convex portion are engaged due to the second bead being disposed at the interior of the convex portion. Due thereto, the rigidity of the connected portion of the gusset and the front side member can be improved.

In accordance with the vehicle front portion structure relating to the present disclosure, the transmission of load from the gusset to the front side member at the time of a collision of the vehicle front portion can be accelerated.

BRIEF DESCRIPTION OF THE DRAWINGS

Exemplary embodiments of the present disclosure will be described in detail based on the following figures, wherein.

DETAILED DESCRIPTION

A first embodiment of a vehicle front portion structure relating to the present disclosure is described hereinafter by using FIG. 1 through FIG. 8. Arrow FR that is shown appropriately in these drawings indicates the vehicle front side, arrow UP indicates the vehicle upper side, and arrow OUT indicates the vehicle transverse direction outer side.

Figure 1:
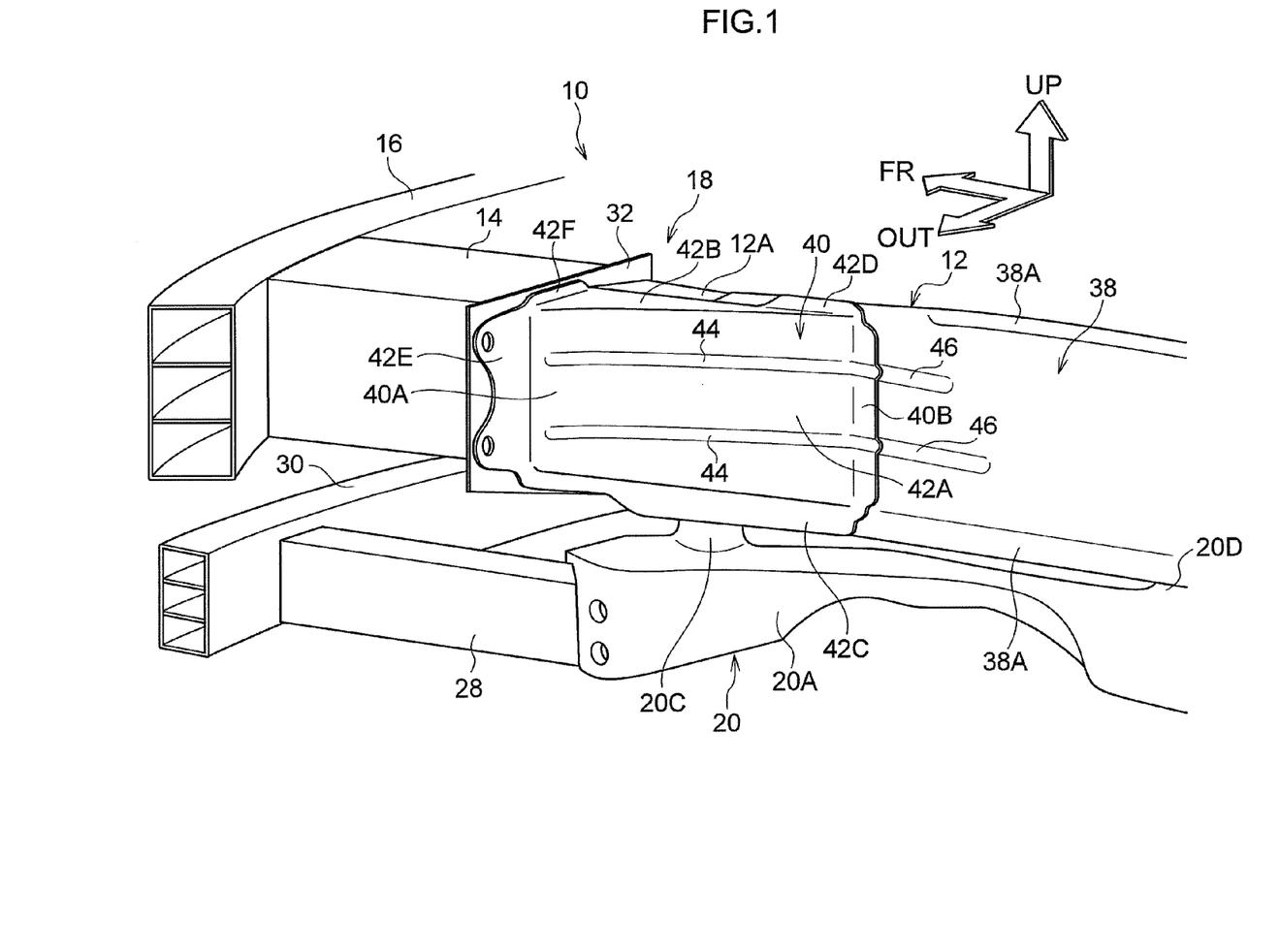
FIG. 1 is a perspective view showing a vehicle front portion structure relating to a first embodiment in a state of being seen obliquely from a vehicle transverse direction outer side and a rear side.

A vehicle front portion structure 18 relating to the present embodiment is shown in FIG. 1 in a perspective view seen obliquely from the vehicle transverse direction outer side and the rear side. The vehicle front portion structure 18 is shown in a side view in FIG. 2A. One outer side portion in the vehicle transverse direction of the vehicle front portion structure 18 is shown in a plan view in FIG. 3. As shown in these drawings, a front side member 12, that extends substantially along the vehicle longitudinal direction, is provided at the transverse direction outer side of a front portion of a vehicle 10 that is an automobile. A crash box 14 serving as a first impact absorbing member is provided at the vehicle front side of the front end portion of the front side member 12. In the present embodiment, the crash box 14 is mounted, via two plate-shaped mounting portions 32, 34, to the vehicle front side of a front portion 12A of the front side member 12. However, the structure for mounting the crash box 14 can be changed.

Although not illustrated, the front side member 12 and the crash box 14 are provided as left and right pairs at the transverse direction both end portions of the vehicle 10. The crash box 14 has a tubular portion that is disposed substantially in the vehicle longitudinal direction, and absorbs collision energy by compressively deforming in the axial direction at the time of input of collision load. A front bumper reinforcement 16 that extends substantially along the vehicle transverse direction is mounted to the vehicle front sides of the crash boxes 14 at the transverse direction both sides of the vehicle 10. The front bumper reinforcement 16 is formed so as to curve such that the vehicle transverse direction central portion thereof protrudes-out further toward the vehicle front side than the vehicle transverse direction both end portions thereof. The vehicle front portion structure 18 of the present embodiment has left-right symmetry at the vehicle transverse direction both sides, and therefore, only the vehicle transverse direction right side as seen in a front view of the vehicle is illustrated, and illustration of the vehicle transverse direction left side as seen in a front view of the vehicle is omitted.

Figure 3:
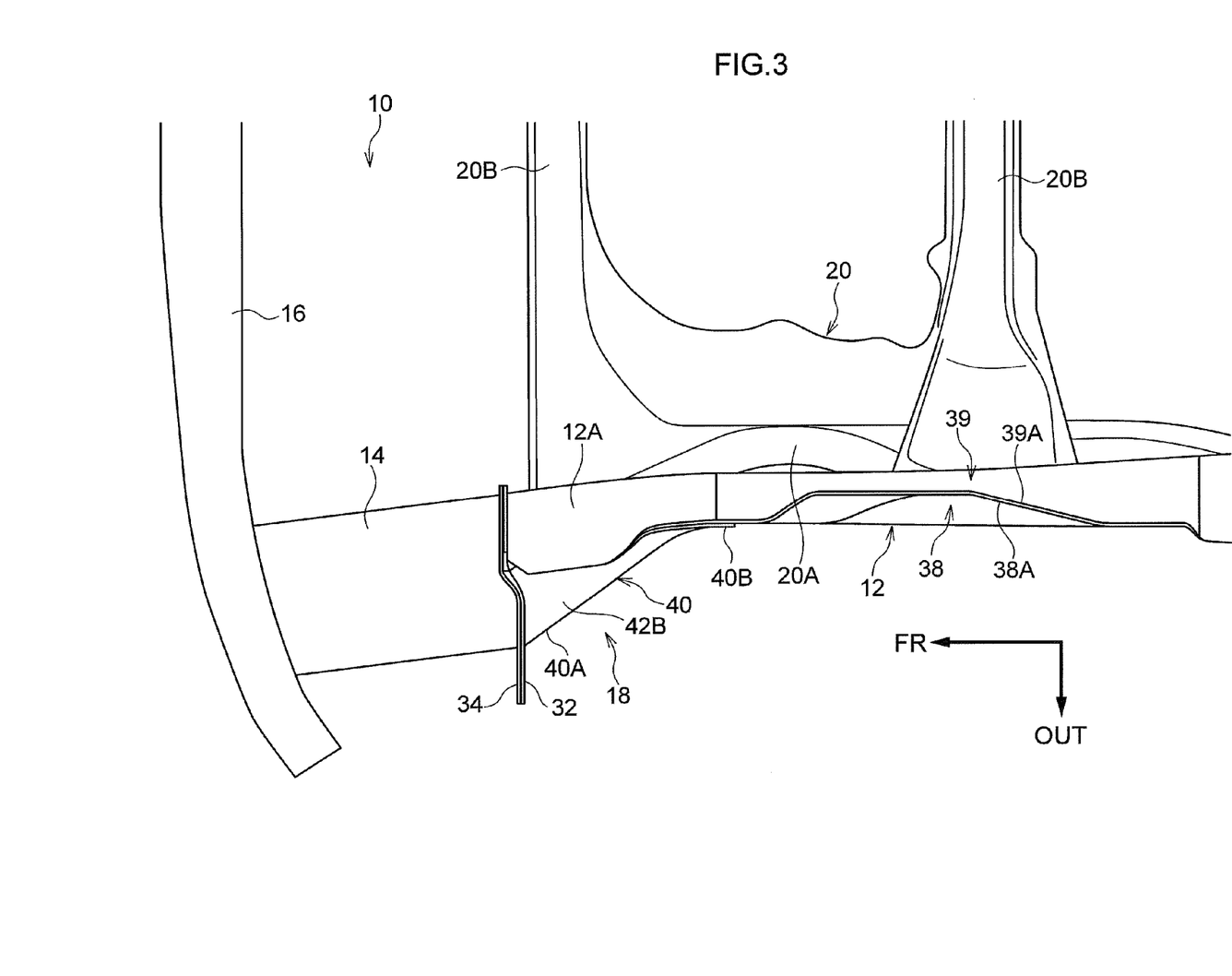
FIG. 3 is a plan view showing a portion of a vehicle transverse direction outer side of the vehicle front portion structure shown in FIG. 1.

A sub-frame 20, that has side portions 20A that extend substantially in the vehicle longitudinal direction, is provided at the lower portion side of the front portion of the vehicle 10 at the vehicle lower sides of the front side members 12. One vehicle transverse direction side of the sub-frame 20 is shown in FIG. 3. As the portion of the sub-frame 20 shown in FIG. 3, the sub-frame 20 is formed in a substantial grid shape as seen in a vehicle plan view. The sub-frame 20 is structured to have left-right symmetry as seen in a vehicle plan view, and has, at the vehicle transverse direction both sides thereof, the pair of left and right side portions 20A that extend substantially in the vehicle longitudinal direction. The side surface at the vehicle transverse direction outer side of the side portion 20A is formed so as to be slightly curved such that the vehicle longitudinal direction intermediate portion thereof is recessed-in further toward the vehicle transverse direction inner side than the vehicle longitudinal direction front end portion and rear end portion thereof. As seen in a vehicle plan view, the front end portions and the rear end portions of the pair of left and right side portions 20A of the sub-frame 20 are respectively joined by a pair of front and rear coupling portions 20B that are disposed along the vehicle transverse direction (see FIG. 3).

Figure 2A:
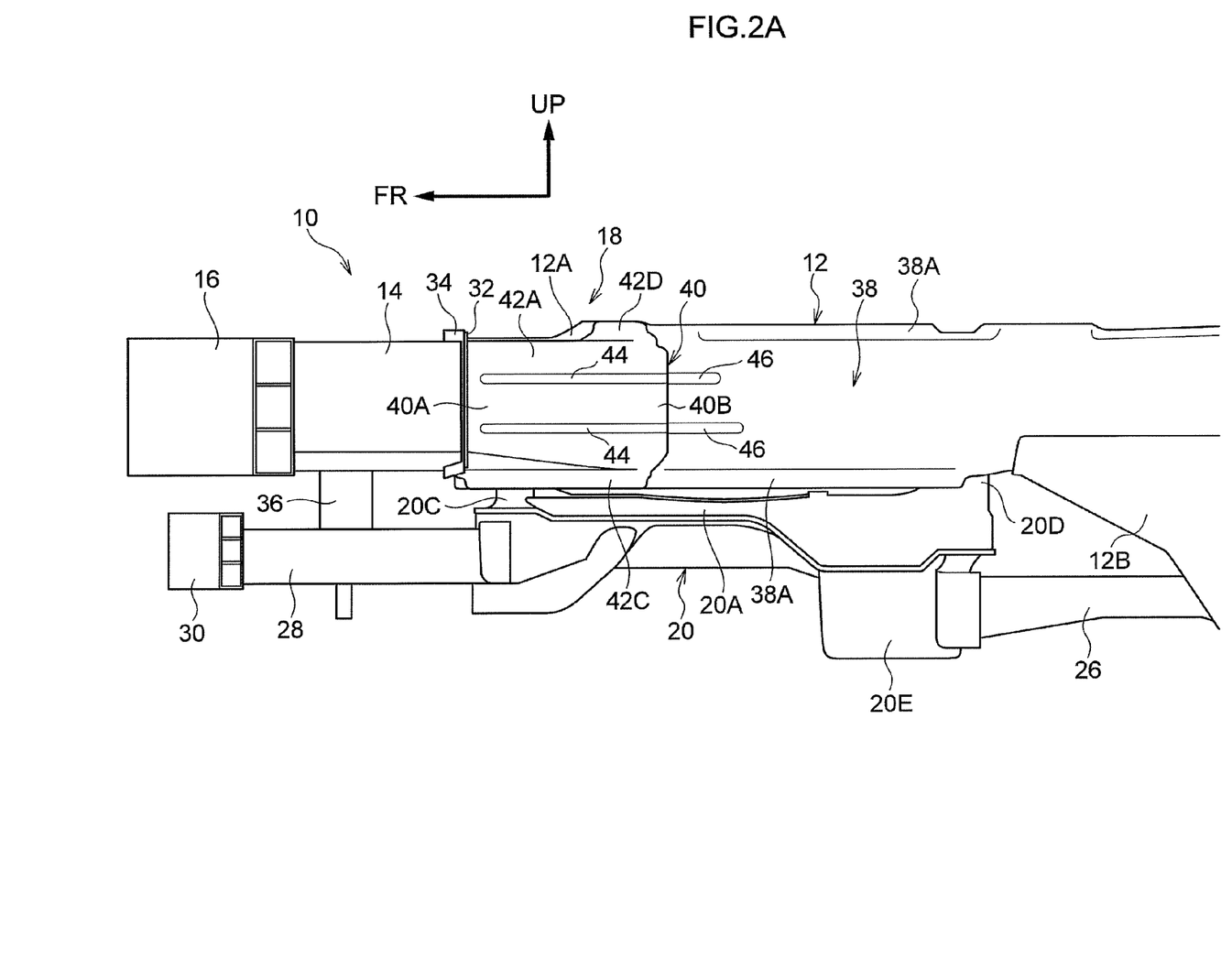
FIG. 2A is a side view showing the vehicle front portion structure shown in FIG. 1.

As shown in FIG. 1 and FIG. 2A, a front side mounting portion 20C that projects-out toward the vehicle upper side is provided at the upper portion of the vehicle longitudinal direction front end portion of the side portion 20A. The front side mounting portion 20C of the side portion 20A is mounted to the front portion 12A side of the front side member 12 via a connecting member 22 (see FIG. 4 and FIG. 5) that is described later.

A rear side mounting portion 20D that projects-out toward the vehicle upper side is provided at the upper portion of the vehicle longitudinal direction rear end portion of the side portion 20A. Further, an inclined portion 12B, that extends obliquely toward the vehicle lower side while heading toward the vehicle rear side, is provided at the vehicle longitudinal direction rear end portion of the front side member 12 (see FIG. 2A). The rear side mounting portion 20D of the side portion 20A is mounted to the vehicle longitudinal direction rear portion side of the front side member 12 (further toward the front side than the inclined portion 12B) via a connecting member 24 that is described later (see FIG. 6 and FIG. 7).

Moreover, a projecting portion 20E, that projects-out toward the vehicle lower side and is for mounting a suspension arm, is provided at the vehicle longitudinal direction rear end portion of the side portion 20A. The projecting portion 20E of the sub-frame 20 is mounted to the lower end portion of the inclined portion 12B of the front side member 12 via a brace (also called suspension member rear frame) 26 that is disposed substantially along the vehicle longitudinal direction.

A second member (also called a lower crash box) 28, that serves as a second impact absorbing member and that extends substantially along the vehicle longitudinal direction, is provided at the vehicle front side of the front end portion of the side portion 20A of the sub-frame 20. Although not illustrated, a left and right pair of the second members 28 are provided at the vehicle transverse direction both end portions. A lower bumper reinforcement 30, that extends substantially along the vehicle transverse direction, is mounted to the vehicle front sides of the second members 28 at the transverse direction both sides of the vehicle 10. The second member 28 has a tubular portion that is disposed substantially along the vehicle longitudinal direction, and absorbs collision energy by compressively deforming in the axial direction at the time of input of collision load. Further, the vehicle longitudinal direction intermediate portion of the second member 28 and the vehicle longitudinal direction intermediate portion of the crash box 14 are coupled by a coupling member 36 that is disposed in the vertical direction (see FIG. 2A).

As shown in FIG. 1 and FIG. 3, the front side member 12 structures a vehicle skeleton member. The front side member 12 has a front side member outer 38 that is disposed at the vehicle transverse direction outer side, and a front side member inner 39 that is disposed at the vehicle transverse direction inner side. In the present embodiment, a pair of upper and lower flange portions 38A are provided at the upper end portion and the lower end portion in the vehicle vertical direction of the front side member outer 38. The front side member 12 that is tubular is formed due to the pair of upper and lower flange portions 38A being joined by welding or the like to a pair of upper and lower flange portions 39A (only the upper portion side is illustrated) that are provided at the upper end portion and the lower end portion in the vehicle vertical direction of the front side member inner 39. Note that the front side member 12 is not limited to the structure of the present embodiment, and can be changed.

At the vehicle front portion structure 18 of the present embodiment, a gusset 40 is provided at the vehicle transverse direction outer side of the front portion 12A in the vehicle longitudinal direction of the front side member 12. As shown in FIG. 1 and the like, a front end portion 40A side in the vehicle longitudinal direction of the gusset 40 is formed in a substantial U-shape that opens toward the vehicle transverse direction inner side as seen in a cross-section along the vehicle transverse direction. A rear end portion 40B in the vehicle longitudinal direction of the gusset 40 has a plate-shaped portion that is disposed substantially along the vehicle vertical direction and contacts the side surface at the vehicle transverse direction outer side of the front side member outer 38. In other words, the gusset 40 has a side surface portion (vertical wall portion) 42A that serves as a side surface and is disposed substantially along the vehicle vertical direction at the vehicle transverse direction outer side. The side surface portion 42A is made to be an inclined surface that is disposed gradually further toward the vehicle transverse direction inner side while heading from the front end portion 40A toward the rear end portion 40B of the gusset 40.

The gusset 40 is disposed such that an upper surface 42B of the front end portion 40A contacts the upper surface of the front side member 12 (the front side member outer 38), and is joined thereto by welding or the like. Further, a flange portion 42C that extends toward the vehicle lower side is provided at the lower end portion of the gusset 40. The flange portion 42C is disposed so as to contact the flange portion 38A at the lower side of the front side member outer 38, and is joined thereto by welding or the like. Further, a flange portion 42D that extends toward the vehicle upper side is provided at the upper end portion of the rear end portion 40B side of the gusset 40. The flange portion 42D is disposed so as to contact the flange portion 38A at the upper side of the front side member outer 38, and is joined thereto by welding or the like. Note that the structure for joining the gusset 40 to the front side member 12 is not limited to the structure of the present embodiment, and can be changed.

Further, a bent portion 42E, that is bent from the side surface portion 42A toward the vehicle transverse direction outer side, and a bent portion 42F, that is bent from the upper surface 42B toward the vehicle upper side, are provided at end edges of the front end portion 40A of the gusset 40 (see FIG. 1). The bent portion 42E and the bent portion 42F are disposed so as to contact the mounting portion 32 that is plate-shaped, and the bent portion 42E and the mounting portions 32, 34 are fastened and fixed by unillustrated fasteners. By providing the bent portion 42E, that is bent toward the vehicle transverse direction outer side, at the gusset 40, the surface area of contact with the bumper reinforcement 16 and the like at the time of a collision of the front portion of the vehicle 10 is increased, and deformation due to surface depression of the bumper reinforcement 16 is suppressed.

Figure 2B:
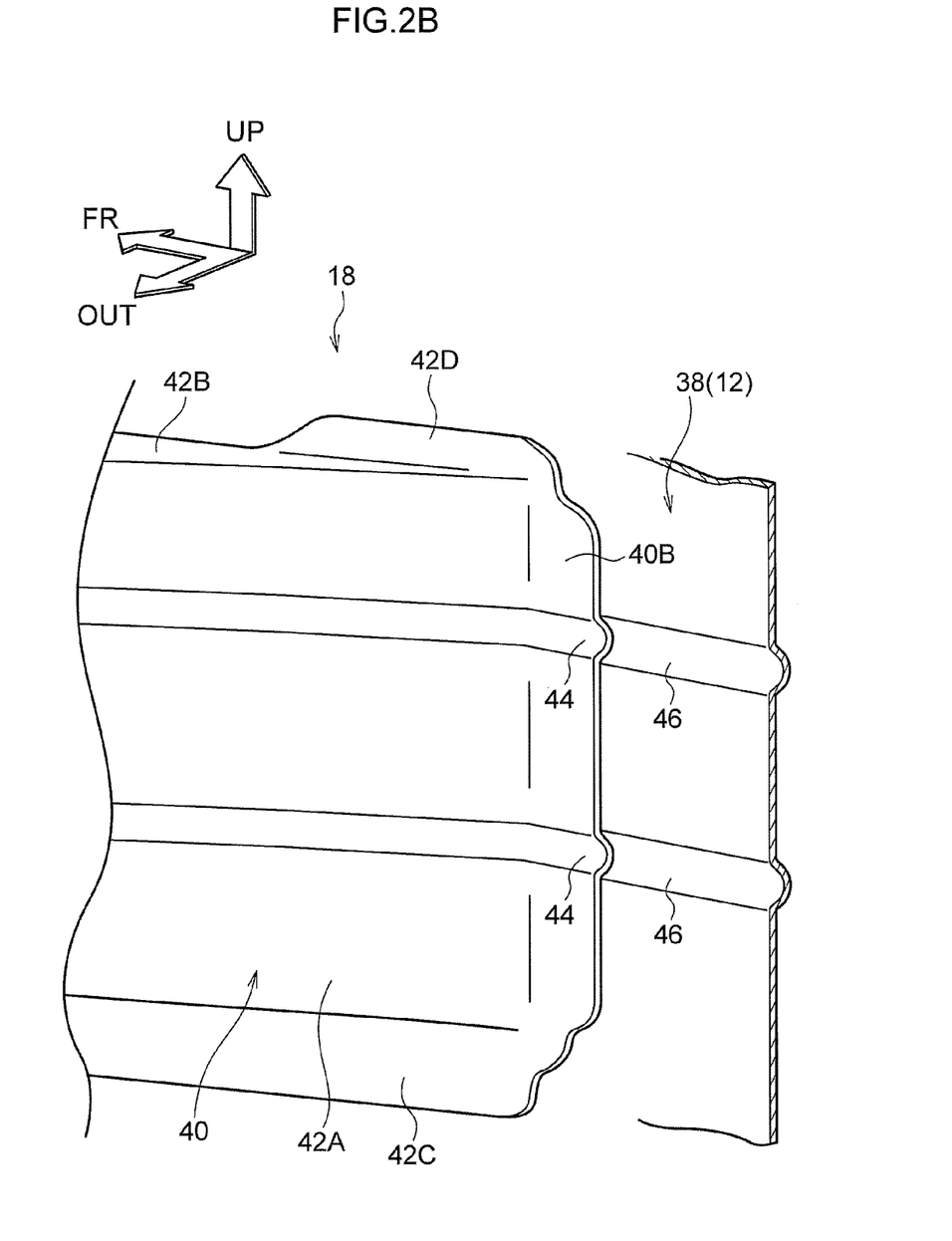
FIG. 2B is a perspective view showing concave portions of a gusset and the vicinity of a second bead of a front side member, that are used in the vehicle front portion structure shown in FIG. 1.

As shown in FIG. 1, FIG. 2A and FIG. 2B, concave portions 44, that serve as first beads and whose length directions are substantially the vehicle longitudinal direction and that are recessed toward the vehicle transverse direction inner side, are provided at the side surface portion 42A of the gusset 40. In the present embodiment, the concave portions 44 are formed in the shapes of curved surfaces, and two of the concave portions 44 are provided at the side surface portion 42A with an interval therebetween in the vertical direction. The rigidity of the gusset 40 itself is improved by the two concave portions 44.

Further, beads 46, that serve as second beads and that are recessed toward the vehicle transverse direction inner side, are provided substantially along the vehicle longitudinal direction in the side surface of the front side member outer 38 of the front side member 12. In the present embodiment, the beads 46 are formed in the shapes of curved surfaces, and two of the beads 46 are provided at the side surface of the front side member outer 38 with an interval therebetween in the vertical direction. The beads 46 are provided so as to match at least the positions of the rear end portions of the concave portions 44 of the gusset 40. The sizes of the curved surfaces at the vehicle transverse direction inner sides of the concave portions 44 are formed to be slightly smaller than the sizes of the curved surfaces at the vehicle transverse direction outer sides of the beads 46, and at least the rear end portions of the concave portions 44 engage with the beads 46. In other words, at least the rear end portions of the concave portions 44 of the gusset 40 are disposed (accommodated) within the beads 46 of the front side member outer 38. Due thereto, the rigidity of the connected portion of the gusset 40 and the front side member 12 is improved. In the present embodiment, the beads 46 are disposed toward the vehicle front side from slightly further rear side of the rear end portions of the concave portions 44 of the gusset 40, so as to match the positions of the rear end portions of the concave portions 44 of the gusset 40. However, the beads 46 are not limited to this. For example, the beads 46 may be disposed along the vehicle longitudinal direction from positions that face the front portions of the concave portions 44 of the gusset 40.

Figure 4:
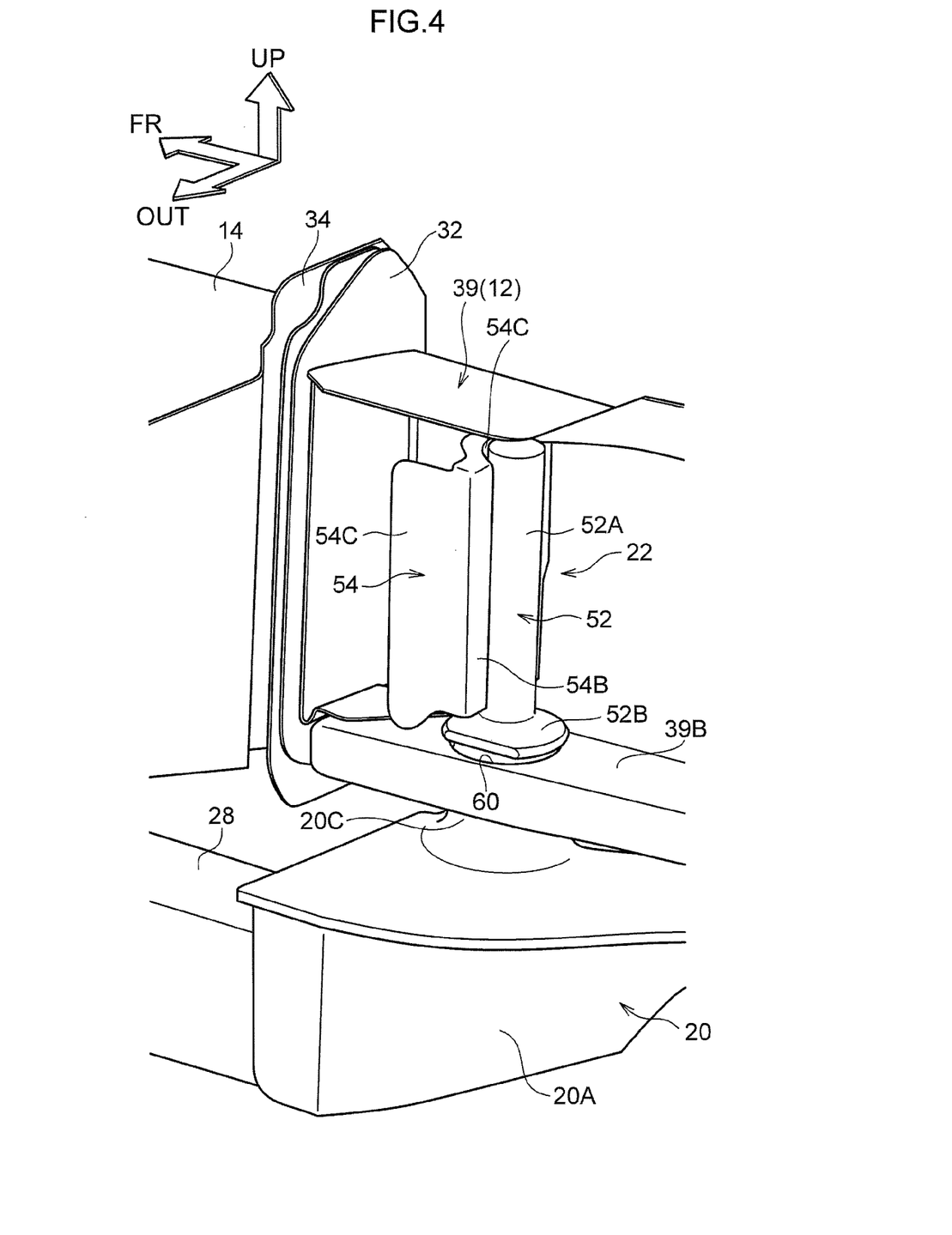
FIG. 4 is a perspective view showing a connecting member that connects, at a front side in a vehicle longitudinal direction, the front side member and a side portion of a sub-frame that are provided at the vehicle front portion structure shown in FIG. 1.
Figure 5:
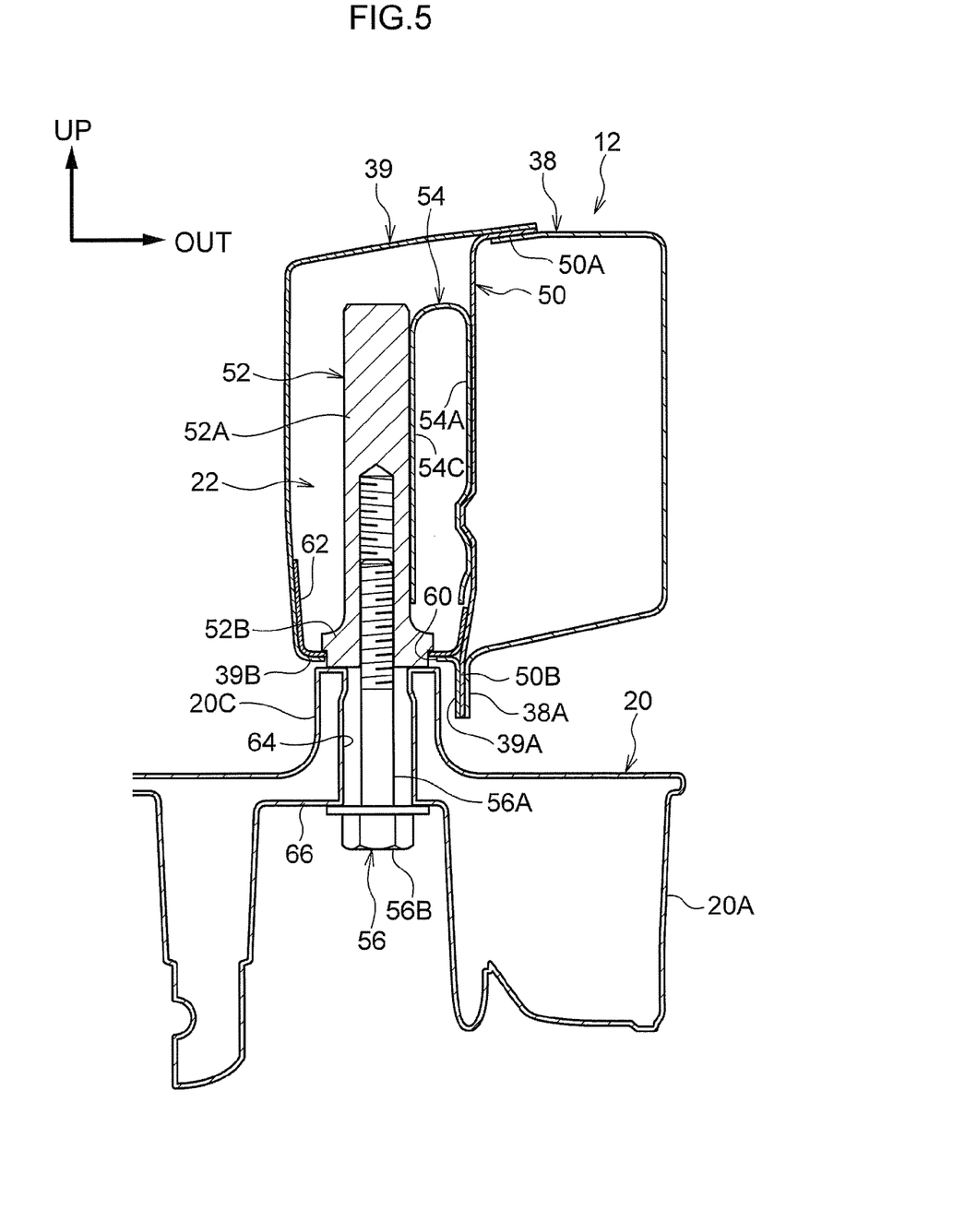
FIG. 5 is a vertical sectional view showing the connecting member that connects, at the front side in the vehicle longitudinal direction, the front side member and the side portion of the sub-frame that are shown in FIG. 4.

As shown in FIG. 1 and FIG. 2A, in the vehicle front portion structure 18 of the present embodiment, as seen in a vehicle plan view (and the same holds when seen in a vehicle side view as well), the front side member 12 and the front side mounting portion 20C, that is provided at the side portion 20A of the sub-frame 20, are connected within the region where the gusset 40 is provided in the vehicle longitudinal direction. As shown in FIG. 4 and FIG. 5, the front side member 12 and the front side mounting portion 20C of the side portion 20A are joined by the connecting member 22. More concretely, the front side member 12 has the front side member outer 38, the front side member inner 39, and a reinforcement 50 that is nipped between the front side member outer 38 and the front side member inner 39 (see FIG. 5). As shown in FIG. 5, a bent portion 50A that is formed at the upper end portion of the reinforcement 50 is joined by welding or the like to the upper surface of the front side member outer 38 and the upper surface of the front side member inner 39 in a state of being nipped by the upper surface of the front side member outer 38 and the upper surface of the front side member inner 39. A lower end portion 50B of the reinforcement 50 is joined by welding or the like to the flange portion 38A of the front side member outer 38 and the flange portion 39A of the front side member inner 39, in a state of being nipped between the flange portion 38A and the flange portion 39A.

The connecting member 22 has a collar (nut) 52 at whose interior a thread portion is formed, a bracket 54 that mounts the collar 52 to the front side member 12, and a bolt 56 that fixes the front side mounting portion 20C and the front side member inner 39. The cross-section of the front side member inner 39 is formed in a substantial U-shape that opens toward the vehicle transverse direction outer side, and the bracket 54 and the collar 52 are disposed at the interior of (within the cross-section of) the front side member inner 39.

As shown in FIG. 4, the bracket 54 has a mounting portion 54A that is joined by welding or the like to the reinforcement 50 (see FIG. 5), a vertical wall portion 54B that is bent from the mounting portion 54A and is disposed substantially along the vehicle vertical direction and substantially along the vehicle transverse direction, and a curved surface portion 54C that is formed at the vehicle transverse direction intermediate portion of the vertical wall portion 54B. The curved surface portion 54C is made to be a shape that is sunken-in in a concave form, and is disposed substantially along the vehicle vertical direction. The curved surface portion 54C is formed so as to be curved so as to match the shape of the outer peripheral surface of a shaft portion 52A of the collar 52. The outer peripheral surface of the shaft portion 52A of the collar 52 contacts the sunken-in surface of the curved surface portion 54C, and, in this state, the shaft portion 52A of the collar 52 is joined by welding (e.g., arc welding) or the like to the curved surface portion 54C of the bracket 54.

As shown in FIG. 5, a flange portion 52B is formed at the lower end of the shaft portion 52A of the collar 52 (see FIG. 4). A through-hole 60 that is substantially circular is formed in a lower surface portion 39B of the front side member inner 39 at a position corresponding to the flange portion 52B (see FIG. 4). A reinforcing portion 62 that is shaped as a substantially U-shaped plate is disposed at the periphery of the through-hole 60 at the upper surface of the lower surface portion 39B of the front side member inner 39. The flange portion 52B of the collar 52 is anchored on the peripheral edge portion of a through-hole of the reinforcing portion 62. A hole portion 64, through which a shaft portion 56A of the bolt 56 passes, is provided substantially along the vehicle vertical direction in the front side mounting portion 20C of the sub-frame 20. A lower surface portion 66, that is sunken-in in a concave shape toward the vehicle upper side, is provided at the side portion 20A of the sub-frame 20 at the peripheral edge of the lower end of the hole portion 64. In a state in which the upper surface of the front side mounting portion 20C of the sub-frame 20 contacts the lower surface of the flange portion 52B of the collar 52, the shaft portion 56A of the bolt 56 is inserted-in from the lower surface portion 66 side of the side portion 20A, and the shaft portion 56A is screwed-together with (fastened with) the thread portion of the collar 52. At this time, due to a head portion 56B side of the bolt 56 contacting the lower surface portion 66 of the side portion 20A, the front side mounting portion 20C of the sub-frame 20 is fixed to the front side member 12.

Figure 6:
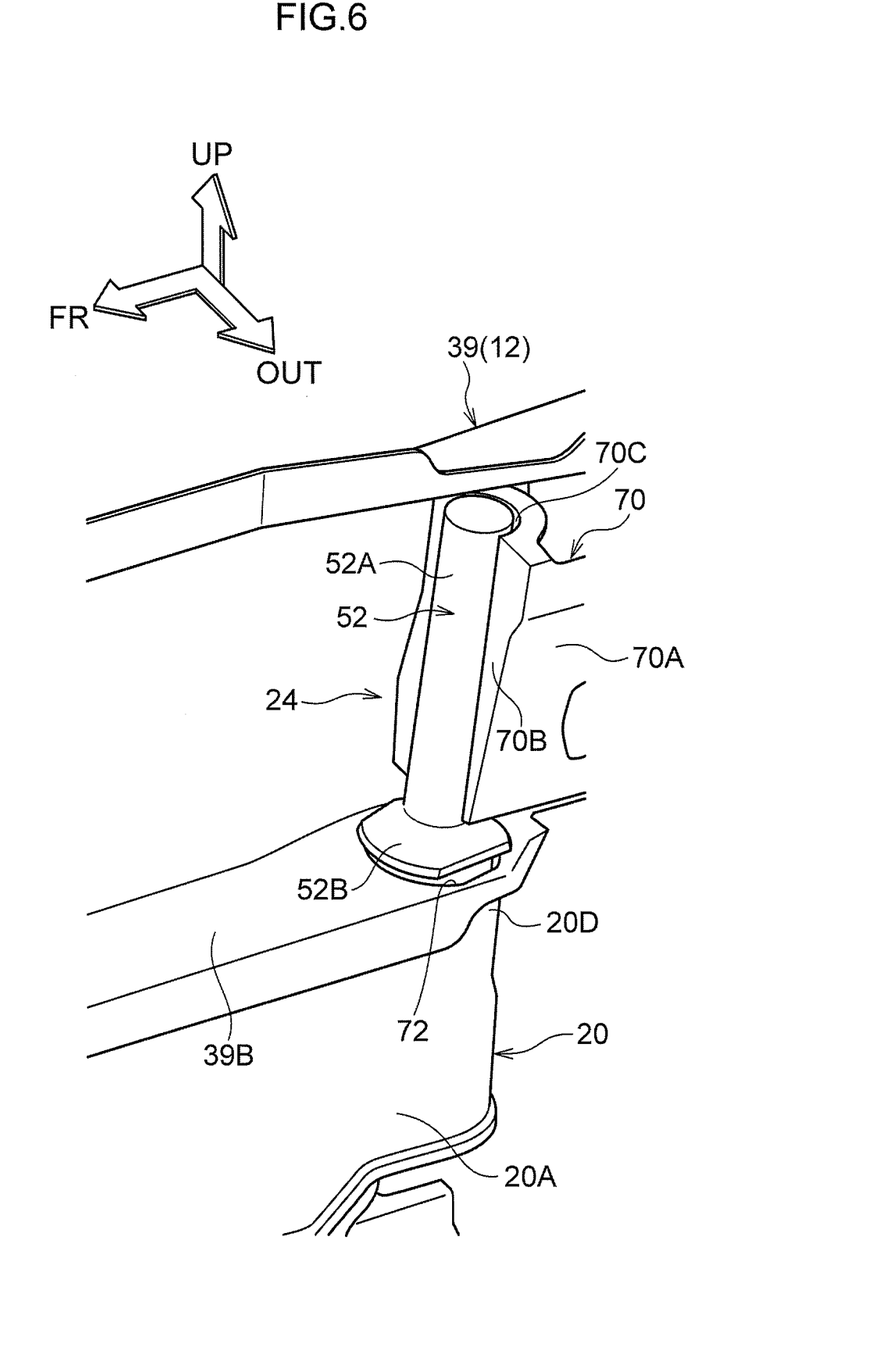
FIG. 6 is a perspective view showing a connecting member that connects, at a rear side in the vehicle longitudinal direction, the front side member and the side portion of the sub-frame that are provided at the vehicle front portion structure shown in FIG. 1.
Figure 7:
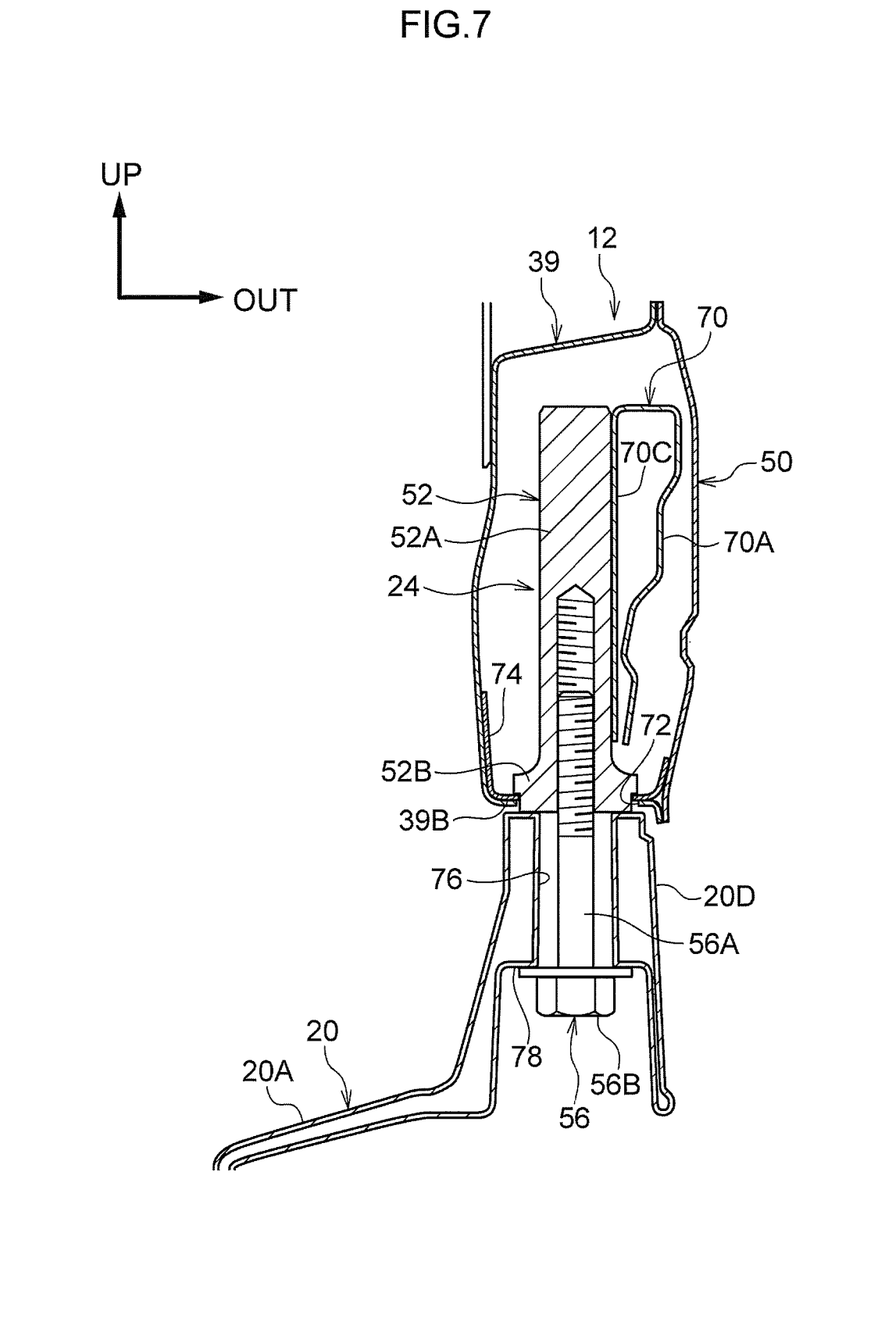
FIG. 7 is a vertical sectional view showing the connecting member that connects, at the rear side in the vehicle longitudinal direction, the front side member and the side portion of the sub-frame that are shown in FIG. 6.

As shown in FIG. 6 and FIG. 7, the front side member 12 and the rear side mounting portion 20D of the side portion 20A are joined by the connecting member 24. The connecting member 24 has the collar (nut) 52 at whose interior a thread portion is formed, a bracket 70 that mounts the collar 52 to the front side member 12, and the bolt 56 (see FIG. 7) that fixes the rear side mounting portion 20D and the front side member inner 39. The cross-section of the front side member inner 39 is formed in a substantial U-shape that opens toward the vehicle transverse direction outer side, and the bracket 70 and the collar 52 are disposed at the interior of (within the cross-section of) the front side member inner 39.

As shown in FIG. 6, the bracket 70 has a mounting portion 70A that is joined by welding or the like to the reinforcement 50 (see FIG. 7) of the front side member 12, a vertical wall portion 70B that is bent from the mounting portion 70A and is disposed substantially along the vehicle vertical direction and substantially along the vehicle transverse direction, and a curved surface portion 70C that is formed at the vehicle transverse direction intermediate portion of the vertical wall portion 70B. The curved surface portion 70C is made to be a shape that is sunken-in in a concave form, and is disposed substantially along the vehicle vertical direction. The outer peripheral surface of the shaft portion 52A of the collar 52 contacts the sunken-in surface of the curved surface portion 70C, and, in this state, the shaft portion 52A of the collar 52 is joined by welding (e.g., arc welding) or the like to the curved surface portion 70C of the bracket 70.

As shown in FIG. 7, a through-hole 72 that is substantially circular is formed in the lower surface portion 39B of the front side member inner 39 at a position corresponding to the flange portion 52B (see FIG. 6). A reinforcing portion 74 that is substantially U-shaped is disposed at the upper surface of the lower surface portion 39B of the front side member inner 39, and the flange portion 52B of the collar 52 is anchored on the peripheral edge portion of a through-hole of the reinforcing portion 74. A hole portion 76, through which the shaft portion 56A of the bolt 56 passes, is provided in the rear side mounting portion 20D of the sub-frame 20 substantially along the vehicle vertical direction. A lower surface portion 78, that is sunken-in in a concave shape toward the vehicle upper side, is provided at the side portion 20A of the sub-frame 20 at the peripheral edge of the lower end of the hole portion 64. In the state in which the upper surface of the rear side mounting portion 20D of the sub-frame 20 contacts the lower surface of the flange portion 52B of the collar 52, the shaft portion 56A of the bolt 56 is inserted-in from the lower surface portion 78 side of the side portion 20A, and the shaft portion 56A is screwed-together with (fastened with) the thread portion of the collar 52. Due thereto, the rear side mounting portion 20D of the sub-frame 20 is fixed to the front side member 12.

As shown in FIG. 1 and FIG. 2A, at the vehicle front portion structure 18, the vehicle longitudinal direction front end portion of the side portion 20A of the sub-frame 20 is positioned further toward the vehicle rear side than the vehicle longitudinal direction front end portion of the front side member 12 (the end edge of the front portion 12A). Moreover, the length, in the vehicle longitudinal direction, of the second member (the lower crash box) 28 that is provided at the vehicle front side of the front end portion of the side portion 20A is longer than the length, in the vehicle longitudinal direction, of the crash box 14 that is provided at the vehicle front side of the front end portion of the front side member 12. In the present embodiment, there is a structure in which, as seen in a vehicle side view, the front end portion of the crash box 14 and the front end portion of the second member (the lower crash box) 28 substantially coincide in the vehicle longitudinal direction (see FIG. 1).

At this time, the length, in the vehicle longitudinal direction, of the surface at the vehicle transverse direction inner side of the crash box 14 is set to be longer than the length, in the vehicle longitudinal direction, of the surface at the vehicle transverse direction outer side (see FIG. 3). The front bumper reinforcement 16 is curved such that, in the state in which the front bumper reinforcement 16 is joined to the front end portions of the crash boxes 14, the vehicle transverse direction central portion of the front bumper reinforcement 16 protrudes-out further toward the vehicle front side than the vehicle transverse direction both end portions thereof. Similarly, the length, in the vehicle longitudinal direction, of the surface at the vehicle transverse direction inner side of the second member 28 is set to be longer than the length, in the vehicle longitudinal direction, of the surface at the vehicle transverse direction outer side. The lower bumper reinforcement 30 is curved such that, in the state in which the lower bumper reinforcement 30 is joined to the front end portions of the second members 28, the vehicle transverse direction central portion of the lower bumper reinforcement 30 protrudes-out further toward the vehicle front side than the vehicle transverse direction both end portions thereof.

Operations of the present embodiment are described next.

As shown in FIG. 1 and the like, at the vehicle front portion structure 18, the front side member 12, that extends substantially along the vehicle longitudinal direction, is provided at the vehicle transverse direction outer side of the front portion of the vehicle 10. The gusset 40 is provided at the vehicle transverse direction outer side of the front portion 12A of the front side member 12. The concave portions 44, whose length directions are substantially the vehicle longitudinal direction and that are concave toward the vehicle transverse direction inner side, are provided at the side surface portion 42A of the gusset 40. In the present embodiment, the two concave portions 44 are provided at the side surface portion 42A with an interval therebetween in the vertical direction.

Further, the bead portions 46 that are concave toward the vehicle transverse direction inner side are provided substantially along the vehicle longitudinal direction in the side surface of the front side member outer 38 of the front side member 12. In the present embodiment, the two beads 46 are provided at the side surface of the front side member outer 38 with an interval therebetween in the vertical direction. The beads 46 are provided so as to match at least the positions of the rear end portions of the concave portions 44 of the gusset 40, and at least the rear end portions of the concave portions 44 are engaged with the beads 46. In other words, the concave portions 44 of the gusset 40 are disposed (accommodated) within the beads 46 of the front side member outer 38.

In this vehicle front portion structure 18, the rigidity of the gusset 40 itself can be improved by the concave portions 44 that are provided in the side surface portion 42A of the gusset 40. Moreover, the rigidity of the connected portion of the gusset 40 and the front side member 12 can be improved due to at least the rear end portions of the concave portions 44 of the gusset 40 being engaged with the beads 46 of the front side member 12. Due thereto, at the time of a collision of the front portion of the vehicle 10, the transmission of load from the gusset 40 to the front side member 12 can be accelerated.

Namely, when load is inputted from the front bumper reinforcement 16 at the time of a collision of the front portion of the vehicle 10, collision energy is absorbed due to the crash box 14 compressively deforming (being crushed) in the axial direction. Moreover, due to input of the front bumper reinforcement 16 after deformation of the crash box 14, input that can deform the front side member 12 toward the vehicle transverse direction inner side can be applied at an early stage to the position of the rear end portion 40B of the gusset 40. For example, in the case of a small overlap collision, some of the collision load is transmitted to the power unit by deformation of the front side member 12 toward the vehicle transverse direction inner side. Due thereto, lateral force with respect to the vehicle 10 can be generated efficiently.

Further, as shown in FIG. 1 and the like, in the vehicle front portion structure 18, the sub-frame 20 that has the side portion 20A that extends along the vehicle longitudinal direction is provided at the vehicle lower side of the front side member 12. Moreover, at the vehicle front portion structure 18, the front side member 12 and the front side mounting portion 20C of the side portion 20A are connected by the connecting member 22 within the region where the gusset 40 is provided substantially in the vehicle longitudinal direction as seen in a vehicle plan view. The second member 28 is provided at the vehicle front side of the front end portion of the side portion 20A.

At the time of a collision of the front portion of the vehicle 10, when load is inputted from the front bumper reinforcement 16, the crush box 14 compressively deforms (is crushed) in the axial direction. At this time, due to the load input of the front bumper reinforcement 16 after deformation of the crash box 14, the transmission of load from the gusset 40 to the front side member 12 can be accelerated. Further, due to load being inputted from the lower bumper reinforcement 30, vicinities at the front and rear of the position, where the coupling member 36 (see FIG. 2A) is provided at the second member 28, compressively deform (are crushed) in the axial direction. Moreover, due to input of load from the lower bumper reinforcement 30, load is transmitted to the side portion 20A of the sub-frame 20, and load is transmitted from the sub-frame 20 to the front side member 12 via the connected portion (the connecting member 22) of the front side mounting portion 20C of the side portion 20A and the front side member 12.

Figure 8:
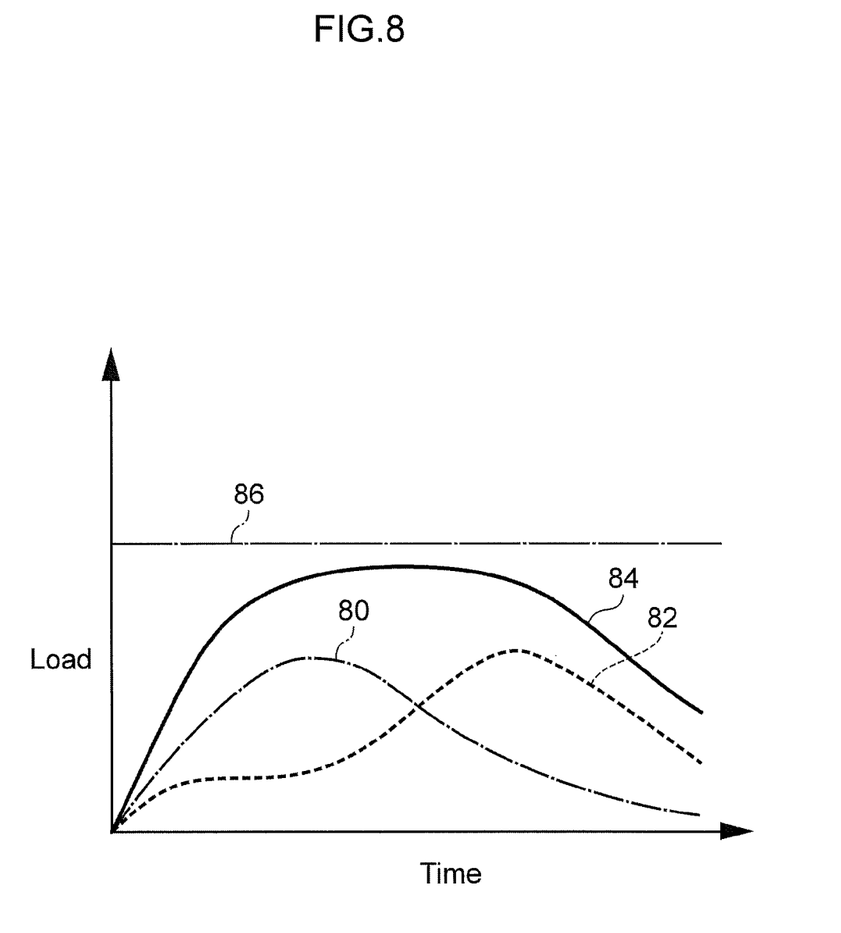
FIG. 8 is a graph showing the relationship between time that has elapsed from collision, and load, in the vehicle front portion structure shown in FIG. 1.

The relationship between time, that has elapsed from a collision of the vehicle front portion, and load, that is applied to the front side member 12 and the like, at the vehicle front portion structure 18 is shown by a graph in FIG. 8. As described above, at the vehicle front portion structure 18, the transmission of load from the gusset 40 to the front side member 12 is accelerated. Therefore, as shown in FIG. 8, the times of occurrence of the peak load of load curve 80 that is applied from the gusset 40 to the front side member 12, and the peak load of load curve 82 that is applied from the side portion 20A of the sub-frame 20 to the front side member 12, are offset. The load, that is transmitted to the rear portion side of the front side member 12 (further toward the rear than the connecting member 22 that is connected to the front side mounting portion 20C), becomes the sum of the deformation load (the load curve 80) that is applied from the gusset 40 to the front side member 12 and the deformation load (the load curve 82) of the side portion 20A of the sub-frame 20, and is shown by load curve 84. The load curve 84 is a gentle curve, and the peak of the load curve 84 is low. Therefore, the support yield strength (straight line 86 in FIG. 8) that is needed at the rear portion side of the front side member 12 can be made to be low.

Moreover, at the vehicle front portion structure 18, by providing the bent portion 42E, that is bent toward the vehicle transverse direction outer side, at the front portion of the gusset 40 as shown in FIG. 1, the surface area of contact with the bumper reinforcement 16 and the like at the time of a collision of the front portion of the vehicle 10 is increased, and deformation due to surface depression of the bumper reinforcement 16 can be suppressed.

Figure 9:
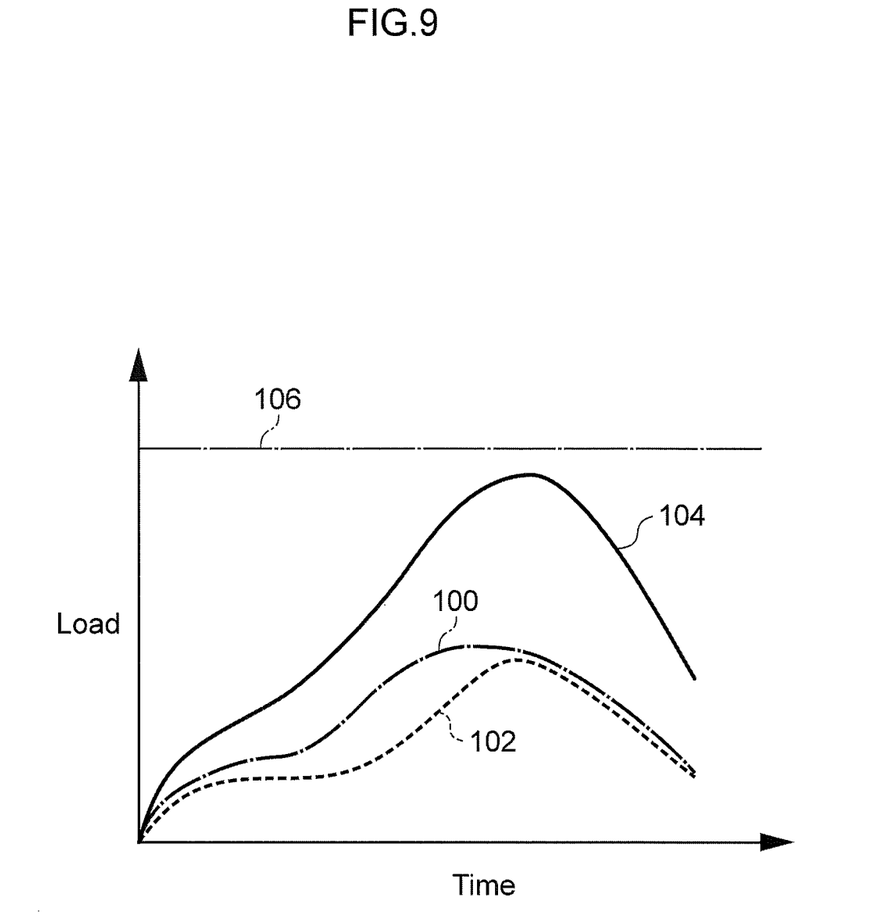
FIG. 9 is a graph showing the relationship between time that has elapsed from collision, and load, in a vehicle front portion structure of a comparative example.

Here, a vehicle front portion structure of a comparative example is described. Although not illustrated, the vehicle front portion structure of the comparative example is a structure in which the gusset 40 is not provided, as compared with the vehicle front portion structure 18 of the present embodiment. The other structures of the vehicle front portion structure of the comparative example are substantially the same as those of the vehicle front portion structure 18 of the present embodiment. The relationship between time, that has elapsed from a collision of the vehicle front portion, and load, that is applied to the front side member and the like, at the vehicle front portion structure of the comparative example is shown by a graph in FIG. 9. As shown in FIG. 9, in this vehicle front portion structure, because the gusset is not provided, the times of occurrence of the peak load of load curve 100 that is applied from the crash box to the front side member, and the peak load of load curve 102 that is applied from the side portion of the sub-frame to the front side member, are substantially the same. The load, that is transmitted to the rear portion side of the front side member becomes the sum of the deformation load (the load curve 100) that is applied from the crash box to the front side member and the deformation load (the load curve 102) of the side portion of the sub-frame, and is shown by load curve 104. The peak of this load curve 104 is high, and therefore, the support yield strength (straight line 106 in FIG. 9) that is needed at the rear portion side of the front side member is high. Therefore, there is the possibility that the weight of a metal plate needed for reinforcement will increase, and further, there are limits on metal plate structures.

In contrast, in the vehicle front portion structure 18 of the present embodiment, as shown in FIG. 8, the peak of the load curve 84 that is transmitted to the rear portion side of the front side member 12 is low, and therefore, the support yield strength (the straight line 86 in FIG. 8) that is needed at the rear portion side of the front side member 12 can be made to be low. Therefore, the burden of load at the rear portion side of the front side member 12 can be reduced, and this relates to lightening of the weight of the supporting structure of the front side member 12.

Further, as shown in FIG. 1 and the like, at the vehicle front portion structure 18, the front end portion of the side portion 20A is positioned further toward the vehicle rear side than the front end portion of the front side member 12 (the end edge of the front portion 12A). Further, the length, in the vehicle longitudinal direction, of the second member 28 that is provided at the vehicle front side of the front end portion of the side portion 20A, is longer than the length, in the vehicle longitudinal direction, of the crash box 14 that is provided at the vehicle front side of the front end portion of the front side member 12. In the present embodiment, there is a structure in which, as seen in a vehicle side view, the front end portion of the crash box 14 and the front end portion of the second member 28 substantially coincide in the vehicle longitudinal direction. Due thereto, at the time of a collision of the front portion of the vehicle 10, the crash box 14 firstly is crushed and load is inputted at an early stage from the gusset 40 to the front side member 12, and then the second member 28 is crushed and load is inputted belatedly to the side portion 20A of the sub-frame 20. Therefore, the times of occurrence of the peak load that is applied from the crash box 14 side to the front side member 12, and the peak load that is applied from the side portion 20A of the sub-frame 20 via the connected portion to the front side member 12, are offset more reliably. Therefore, the burden of load at the rear portion side of the front side member 12 can be reduced more reliably.

A second embodiment of the joining structure relating to the present disclosure is described next by using FIG. 10. Note that, in the second embodiment, structural elements, members and the like that are the same as those of the first embodiment are denoted by the same reference numerals, and detailed description thereof is omitted.

Figure 10:
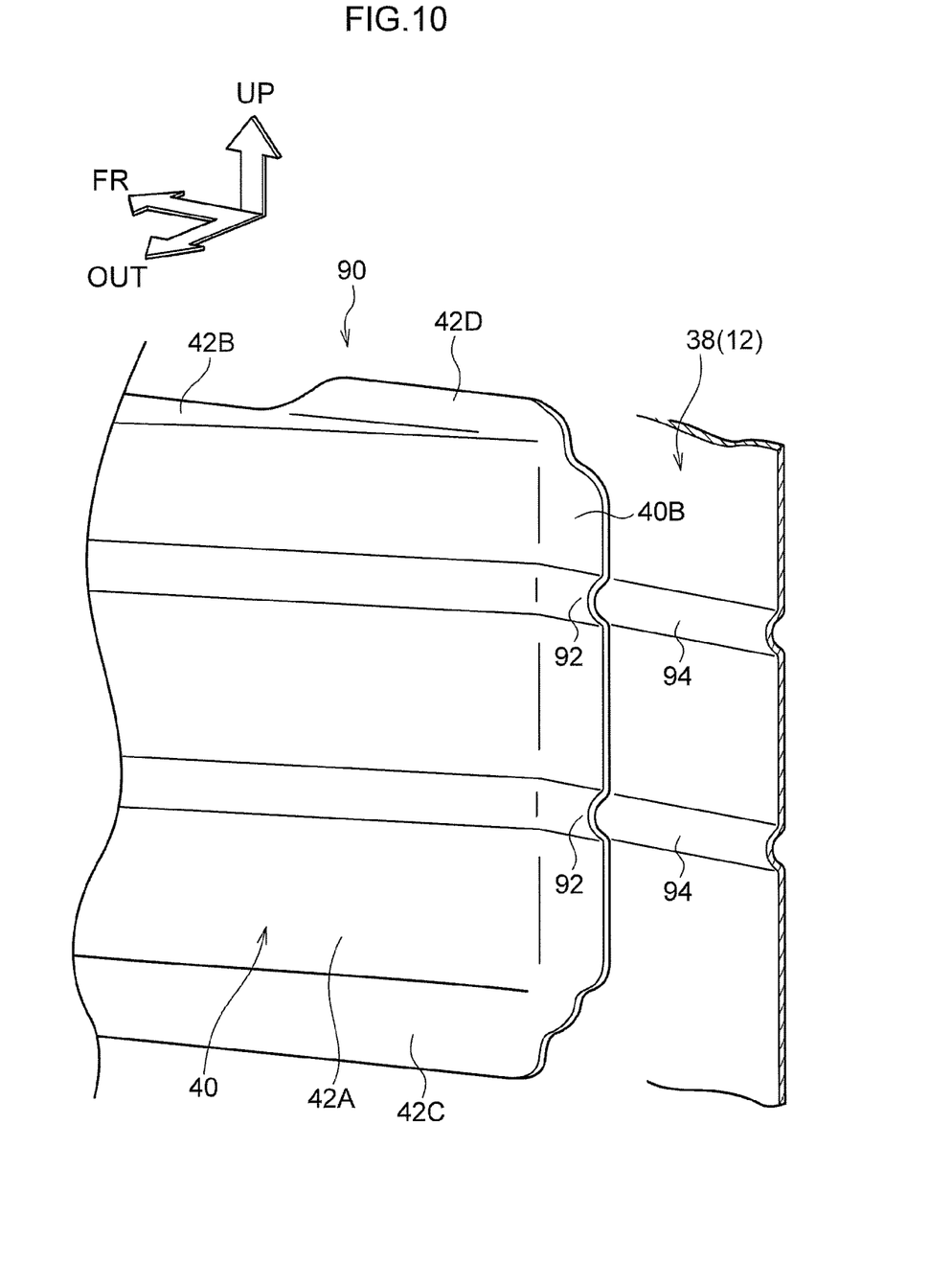
FIG. 10 is a perspective view showing convex portions of the gusset and the vicinity of the second bead of the front side member, that are used in a vehicle front portion structure of a second embodiment.

As shown in FIG. 10, in a vehicle front portion structure 90 of the present embodiment, convex portions 92, that serve as first beads and whose length directions substantially are the vehicle longitudinal direction and that project-out toward the vehicle transverse direction outer side, are provided at the side surface portion 42A of the gusset 40. In the present embodiment, the convex portions 92 are formed in the shapes of curved surfaces, and the two convex portions 92 are provided at the side surface portion 42A with an interval therebetween in the vertical direction. The rigidity of the gusset 40 itself can be improved by these two convex portions 92.

Further, beads 94, that serve as second beads and that project-out toward the vehicle transverse direction outer side, are provided substantially along the vehicle longitudinal direction at the side surface of the front side member outer 38 of the front side member 12. In the present embodiment, the beads 94 are formed in the shapes of curved surfaces, and the two beads 94 are provided at the side surface of the front side member outer 38 with an interval therebetween in the vertical direction. The beads 94 are provided so as to match at least the positions of the rear end portions of the convex portions 92 of the gusset 40. The sizes of the curved surfaces at the vehicle transverse direction inner sides of the convex portions 92 are formed to be slightly larger than the sizes of the curved surfaces at the vehicle transverse direction outer sides of the beads 94, and the convex portions 92 are engaged with the beads 94. In other words, the beads 94 of the front side member outer 38 are disposed (accommodated) within the convex portions 92 of the gusset 40.

In this vehicle front portion structure 90, the rigidity of the gusset 40 itself is improved by the convex portions 92 that are provided at the side surface portion 42A of the gusset 40. Moreover, the rigidity of the connected portion of the gusset 40 and the front side member 12 is improved due to at least the rear end portions of the convex portions 92 of the gusset 40 being engaged with the beads 94 of the front side member 12. Due thereto, at the time of a collision of the front portion of the vehicle 10, the transmission of load from the gusset 40 to the front side member 12 can be accelerated.

Note that, in the vehicle front portion structure, the number of and the shape of the first beads that are provided at the gusset, and the number of and the shape of the second beads that are provided at the front side member (the front side member outer) are not limited to those of the structures of the first and second embodiments, and can be changed.

Further, in the vehicle front portion structure, the structure of the connecting member that connects the side portion of the sub-frame to the front side member is not limited to the structure of the first embodiment, and can be changed.

Further, in the first embodiment, there is a structure in which, as seen in a vehicle side view, the front end portion of the crush box 14 and the front end portion of the second member 28 substantially coincide in the vehicle longitudinal direction. However, the present disclosure is not limited to this, and may be structured such that the front end portion of the crash box 14 and the front end portion of the second member 28 are offset in the vehicle longitudinal direction.

What is claimed is:

1. A vehicle front portion structure comprising:
a front side member that extends along a vehicle longitudinal direction at a vehicle transverse direction outer side of a vehicle front portion;
a gusset that is provided at a vehicle transverse direction outer side of a vehicle longitudinal direction front portion of the front side member;
a first bead that is provided at a side surface of the gusset with the vehicle longitudinal direction being a length direction thereof, and that is configured as a concave portion that is recessed toward a vehicle transverse direction inner side or as a convex portion that projects out toward a vehicle transverse direction outer side; and
a second bead that is provided at a side surface of the front side member, and that is engaged with at least a rear end portion of the first bead.

2. The vehicle front portion structure of claim 1, wherein:
a sub-frame having a side portion that extends along the vehicle longitudinal direction is further provided at a vehicle lower side of the front side member, and
as seen in a vehicle plan view, the front side member and the side portion are connected within a region at which the gusset is provided in the vehicle longitudinal direction.

3. The vehicle front portion structure of claim 2, wherein:
a vehicle longitudinal direction front end portion of the side portion is positioned further toward a vehicle rear side than a vehicle longitudinal direction front end portion of the front side member,
a first impact absorbing member is provided at a vehicle front side of the front end portion of the front side member,
a second impact absorbing member is provided at a vehicle front side of the front end portion of the side portion, and
a second length, in the vehicle longitudinal direction, of the second impact absorbing member is longer than a first length, in the vehicle longitudinal direction, of the first impact absorbing member.

4. The vehicle front portion structure of claim 3, wherein, as seen in a vehicle side view, a vehicle longitudinal direction front end portion of the first impact absorbing member and a vehicle longitudinal direction front end portion of the second impact absorbing member are configured so as to coincide in the vehicle longitudinal direction.

5. The vehicle front portion structure of claim 1, wherein:
the first bead is the concave portion,
the second bead is made into a shape that is recessed toward a vehicle transverse direction inner side, and
the second bead and the concave portion are engaged due to the concave portion being disposed at an interior of the second bead.

6. The vehicle front portion structure of claim 1, wherein:
the first bead is the convex portion,
the second bead is made into a shape that projects-out toward a vehicle transverse direction outer side, and
the second bead and the convex portion are engaged due to the second bead being disposed at an interior of the convex portion.

* * * * *